Sept. 18, 1956 A. KAREM 2,763,170
INSULATION STRIPPING ATTACHMENT FOR SOLDERING IRONS
Filed June 21, 1954
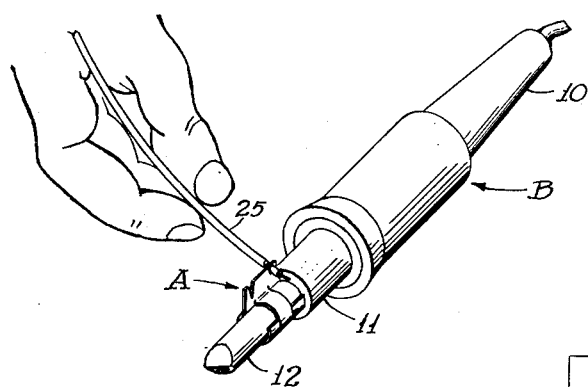
*Fig. 1*
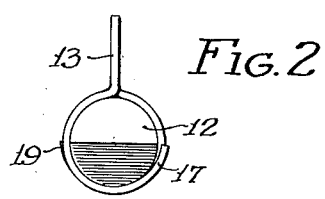
*Fig. 2*
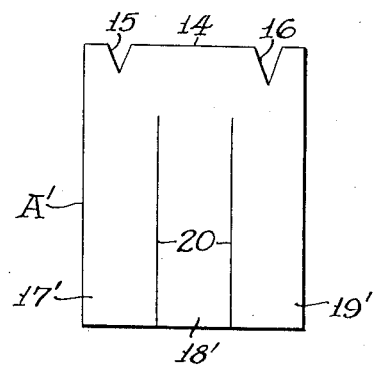
*Fig. 5*
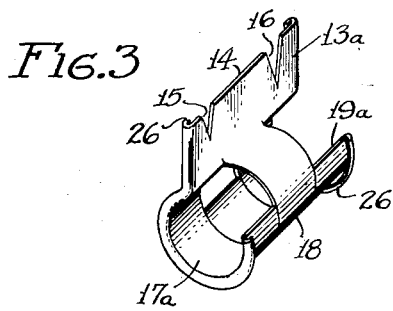
*Fig. 3*
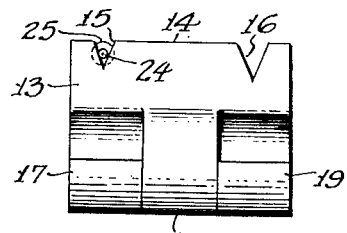
*Fig. 4*
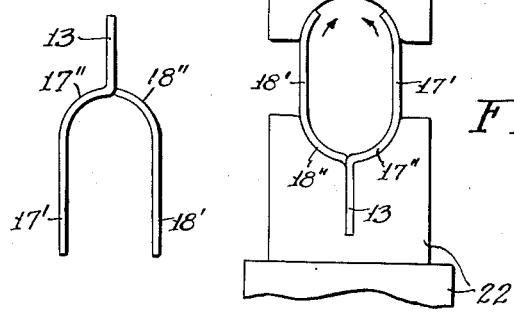
*Fig. 6*  *Fig. 7*
INVENTOR
ALBERT KAREM
BY Lynn H Latta
— ATTORNEY ered sheet metal part comprising a flat, rectangular
United States Patent Office 2,763,170
Patented Sept. 18, 1956

2,763,170

INSULATION STRIPPING ATTACHMENT FOR SOLDERING IRONS

Albert Karem, Santa Monica, Calif.

Application June 21, 1954, Serial No. 438,275

2 Claims. (Cl. 81—9.5)

This invention relates to a device for stripping insulation from electric conductor wires. In general, the object of the invention is to provide a simple, inexpensive attachment for a soldering iron, useful in stripping insulation from the end of a conductor wire.

A specific object of the invention is to provide an insulation stripping attachment which is attachable to the tip of a soldering iron in a manner to receive heat therefrom by conduction and to utilize such heat in stripping the insulation.

A further object is to provide such an attachment, adapted to be carried by a soldering iron tip without interfering with normal use of the tip in a soldering operation.

A further object is to provide such a device which can be fabricated inexpensively from a single sheet of metal, by a stamping and forming operation.

Other objects will become apparent in the ensuing specification and appended drawing in which:

Fig. 1 is a perspective view of a soldering iron with my improved stripping attachment applied thereto;

Fig. 2 is an end view of the same;

Fig. 3 is a perspective view of the stripper attachment;

Fig. 4 is a side view of the same;

Fig. 5 is a plan view of the sheet metal blank for the stripper;

Fig. 6 is an end view of the partially formed blank; and

Fig. 7 is a view illustrating the final forming operation.

Referring now to the drawings in detail, I have shown, as an example of one form in which my invention may be embodied, an insulation stripper attachment which is indicated generally at A, in connection with a soldering iron which is indicated generally at B. Soldering iron B may include, conventionally, a handle portion 10, housing a conventional heating element, a socket 11 at the forward end of handle portion 10, and a soldering tip 12 secured in socket 11 and receiving heat from the heating element in handle 10.

My improved stripping attachment A is adapted to be mounted upon tip 12 in a manner to receive heat therefrom, by conduction, while being readily removable therefrom or attachable thereto simply by sliding it axially on the tip 12.

Referring to Fig. 3, the stripper A consists in a head 13 in the form of a flat rectangular vane having a longitudinal margin 14 in which are a pair of V-shaped notches 15, 16; together with three or more claws 17, 18, 19, of semi-cylindrical hook form, which are designed to embrace, encircle and grasp the tip 12 with sufficient resilient pressure to secure the stripper A to tip 12 and hold it against rotating thereon when in use. The diameter of the loop defined by claws 17, 18, 19 may, in the unstressed state, be substantially smaller (e. g. by 1/16") than the diameter of tip 12, so that the claws must be sprung apart to encompass the tip. The constant yielding pressure of the claws against the tip, in grasping it, provides for efficient transfer of heat by conduction from the tip into the stripper A, heating it to a temperature at which the plastic tubing insulating sheath with which it is now customary to insulate conductor wires of the smaller gauges, will readily melt.

Stripper attachment A is fabricated as an integral, one piece part, from sheet metal, preferably of good heat conductivity, by die blanking and forming operations, whereby a very inexpensive part is produced.

Figs. 5–7 illustrate how stripper A is fabricated simply from a substantially square blank A' of sheet metal, with virtually no wastage of material. Two slits 20 are lanced in the blank A' in the side thereof opposite the side in which the notches 15, 16 are cut, thus forming tongues 17', 18', 19'. This lancing operation may be part of the blanking operation in which the blank A' is stamped out of a sheet or strip of metal stock. In a subsequent partial forming operation, the three tongues of metal separated by slits 20 are spread apart and given the root shape of the claws 17, 18, 19 (shoulder portions indicated at 17", 18"). In a final forming operation, as indicated in Fig. 7, the head 13 and shoulder portions may be supported in the lower die block 22 of a forming die, and the upper die block 23 may then be moved downwardly against the ends of tongues 17', 18', curling them inwardly as indicated by the arrows in Fig. 7.

In using the stripper, a wire, with its plastic tube sheath 25, is laid in one of the notches 15, 16 (notch 15 for wires of smaller diameter—notch 16 for wires of larger diameter) and is gently pressed against the edges of the notch and rotated back and forth. The heated edges of the notch will quickly cut through the insulation, severing an end portion of the sheath 25, which may then be engaged by the workman's fingernails and slid off the end of wire 24, leaving a bared portion of the wire projecting from a cleanly squared end of sheath 25, free of cracks and torn edges. The entire operation can be performed in several seconds of time.

The claws 17, 18, and 19 are disposed symmetrically with relation to the projected plane of stripper head 13, the axis of the loop defined between the claws being disposed in said projected plane. Thus when the stripper is attached to the soldering iron tip 12, the stripper head 14 will be disposed in a radial plane of the axis of tip 12, in general alignment with handle 10 so as to be in a most advantageous position for use in the operation disclosed in Fig. 1.

In Figs. 1, 2 and 4 the device is shown with plain edges. Fig. 3 discloses a modified form wherein the edges are reinforced by rolled beads 26 along the end edges of stripper head 13a and claws 17a and 19a.

While the best results are obtained by rotating the wire in the stripper notch, it is not necessary to do this, it being possible to pull the severed end portion loose after partial severing attained simply by laying the wire in the notch.

I claim:

1. An insulation stripper for attachment to a soldering iron including a soldering tip of bar form which is heated when in use, said stripper consisting in a one piece formed sheet metal part comprising a flat, rectangular stripper head having a longitudinal edge and a V-notch opening into said edge for reception of a wire to be bared; and a plurality of claws, each of generally semi-cylindrical form, collectively defining a tubular open loop having a cross sectional shape conforming to the lateral configuration of said tip, and including a pair of claws at the respective ends of said stripper head, extending in one direction around the circumference of said loop and an intermediate claw extending in the other direction around said loop, said three claws constituting integral extensions of said stripper head and projecting from one longitudinal margin thereof with the plane of said stripper head disposed substantially diametrically of said loop, said claws extending substantially in excess of 180° and having free end portions the side margins of which are in overlapping abutment on a common cylindrical circumference, said loop being normally of slightly smaller diameter than said tip, whereby said loop is expanded when the tip is inserted therein and said claws will thus yieldingly grip and cling to the tip so as to secure the stripper to the tip, maintain it in fixed relation thereto during use and provide for a good heat conducting connection between the stripper and the tip, whereby the stripper is maintained substantially at the temperature of the tip, so as to burn through a plastic insulation sheath covering a conductor wire laid in said notch.

2. A stripper attachment as defined in claim 1, including marginal reinforcing beads extending integrally and continuously along the ends of said stripper head and around the circumferential outer margins of said outer claws.

References Cited in the file of this patent

UNITED STATES PATENTS

| | | |
|---|---|---|
| 1,654,756 | Ryan | Jan. 3, 1928 |
| 2,620,692 | Marshall | Dec. 9, 1952 |

FOREIGN PATENTS

| | | |
|---|---|---|
| 581,618 | Great Britain | Oct. 18, 1946 |